United States Patent

Salt et al.

[11] Patent Number: 5,758,487
[45] Date of Patent: Jun. 2, 1998

[54] GAS TURBINE ENGINE WITH AIR AND STEAM COOLED TURBINE

[75] Inventors: Allan J. Salt, Warwickshire; Alan Cash, Leicestershire; Carlton Smith, Huddersfield, all of England

[73] Assignee: Rolls-Royce plc, London, England

[21] Appl. No.: 746,165

[22] Filed: Nov. 6, 1996

[30] Foreign Application Priority Data

Nov. 14, 1995 [GB] United Kingdom ............. 9523223

[51] Int. Cl.$^6$ ............................................. F02C 7/16
[52] U.S. Cl. ............................. 60/39.75; 415/114
[58] Field of Search .................... 60/39.07, 39.182, 60/39.53, 39.54, 39.75; 415/115

[56] References Cited

U.S. PATENT DOCUMENTS

| | | | |
|---|---|---|---|
| 2,647,368 | 8/1953 | Triebbnigg et al. | 60/39.54 |
| 4,213,738 | 7/1980 | Williams. | |
| 4,820,116 | 4/1989 | Hovan et al. | |
| 5,003,766 | 4/1991 | Paul | 60/39.75 |
| 5,320,483 | 6/1994 | Cunha et al. | 415/114 |
| 5,340,274 | 8/1994 | Cunha | 415/114 |

FOREIGN PATENT DOCUMENTS

| | | |
|---|---|---|
| 2 127 906 | 4/1984 | United Kingdom. |
| 2 137 283 | 10/1984 | United Kingdom. |
| 2 224 319 | 5/1990 | United Kingdom. |
| 2 253 442 | 9/1992 | United Kingdom. |

*Primary Examiner*—Louis J. Casaregola
*Attorney, Agent, or Firm*—Cushman Darby & Cushman Intellectual Property Group of Pillsbury Madison & Sutro LLP

[57] ABSTRACT

In a gas turbine engine including a turbine which has a closed cycle steam cooling system and an open cycle gas cooling system sealing arrangements are provided between adjacent pairs of turbine rotor stages. The sealing arrangement has axially extending passages to supply cooling gas from one of the turbine rotor stages to the cooling gas passages in the turbine rotor blades. Each sealing arrangement comprises a pair of sealing formations each made up of a plurality of sealing segments. Also the sealing arrangement has axially extending passages to supply steam from one of the turbine rotor stages to the steam cooling passages in the turbine rotor blades.

19 Claims, 3 Drawing Sheets

GAS TURBINE ENGINE WITH AIR AND STEAM COOLED TURBINE

FIELD OF THE INVENTION

The present invention relates to a gas turbine engine, particularly to a gas turbine engine in which the turbine blades are provided with cooling passages supplied with cooling fluids at different pressures or different cooling fluids. The present invention in particular relates to industrial gas turbine engines having a closed cycle steam cooling system and an open cycle gas cooling system.

BACKGROUND OF THE INVENTION

Industrial gas turbine engines generally comprise a gas generator consisting of a compressor, a combustion apparatus in which fuel and air are mixed and burnt, a turbine which is driven by the products of combustion and which drives the compressor, and a power turbine driven by the high temperature high velocity gases from the gas generator. The power turbine is arranged to drive loads such as an electricity generator, or pump for pumping oil or gas.

Heavyweight industrial gas generators are bulky and there are large distances between the bearings of a shaft on which the compressor and turbine are mounted. The turbine and a gas generator will comprise one or more stages of blades, each stage comprising an array of rotor blades mounted on the gas generator shaft and an array of stator vanes mounted from the casing of the gas generator. The high temperature, high velocity gases flow through an annular passage in which the rotating rotor blades and stationary stator vanes are disposed and the radially inner boundary of the annular passage is partially defined by platforms on the inner ends of the stator vanes. These platforms are usually sealingly engaged by sealing elements secured to rotors on which the rotor blades are located.

In the case of relatively low power engines a seal can be achieved by casting projections or "wings", otherwise known as heat shields, onto the platforms at the inner ends of the rotor blades. These projections on the rotor blades on adjacent stages abut one another to form a seal. In the case of relatively large power engines a seal can be achieved by providing separate sealing segments which extend between adjacent rotors. The sealing segments are provided with axially extending dogs which engage underneath axial projections on the rotors, as is disclosed in our published UK patent application No 2272946A. Also in the case of relatively large power engines a seal can be achieved by providing separate sealing segments which extend between adjacent rotors. The sealing segments are provided with axially extending feet which engage between inner and outer lands on the rotors, as is disclosed in our published UK patent application No 2272947A. A further possibility in the case of relatively large power engines a seal can be achieved by providing separate sealing segments which extend between adjacent rotors. The sealing segments are provided with serrated feet which engage in the blade root slots, as is disclosed in our published UK patent application No 2280478A.

In a gas turbine engine including a turbine having a closed cycle steam cooling system and an open cycle air cooling system it is difficult to arrange for the steam and air cooling system to supply the blades on the different turbine rotor stages without leakage of steam into the air or visa-versa. This requirement also applies to the use of the same cooling fluid at different pressures.

SUMMARY OF THE INVENTION

The present invention seeks to provide a gas turbine engine which overcomes the above mentioned problem.

Accordingly the present invention provides a gas turbine engine including a multi-stage turbine having a first cooling system and a second cooling system, said engine comprising a first rotor stage having a plurality of first turbine rotor blades, each first turbine rotor blade having a first passage for the flow of a first cooling fluid and a second passage for the flow of a second cooling fluid, a second rotor stage having a plurality of second turbine rotor blades, each second turbine rotor blade having a third passage for the flow of the first cooling fluid and a fourth passage for the flow of the second cooling fluid, a first sealing arrangement extending axially between the first and second rotor stages, a first chamber formed between the first and second rotor stages and the first sealing arrangement, the first sealing arrangement having at least one passage extending axially between the first and second rotor stages to supply the first cooling fluid, or the second cooling fluid, between the first and second rotor stages such that the second passages or fourth passages are supplied with the second cooling fluid or the first passages or the third passages are supplied with the first cooling fluid.

Preferably the first cooling fluid is steam and the second cooling fluid is gas.

Preferably the multi-stage turbine has a closed cycle steam cooling system and an open cycle gas cooling system, each first turbine rotor blade having a first closed passage for the flow of steam and a second passage for the flow of gas which is open to discharge the gas from the trailing edge of the first turbine rotor blade, each second turbine rotor blade having a third closed passage for the flow of steam and a fourth passage for the flow of gas which is open to discharge the gas from the trailing edge of the second turbine rotor blade, a first sealing arrangement extending axially between the first and second rotor stages.

Preferably there are means to supply cooling gas to the second passages in the first turbine rotor blades and the at least one passage in the first sealing arrangement, said at least one passage in the first sealing arrangement being arranged to supply cooling gas to the fourth passages in the second turbine rotor blades, means to supply steam to the first passages in the first turbine rotor blades and the first passages being arranged to supply steam to the first chamber.

Alternatively there may be means to supply steam to the first passages in the first turbine rotor blades and the at least one passage in the first sealing arrangement, said at least one passage in the first sealing arrangement being arranged to supply steam to the third passages in the second turbine rotor blades, means to supply cooling gas to the second passages in the first turbine rotor blades and means to supply cooling gas to the fourth passages in the second turbine rotor blades.

Preferably there is a third rotor stage having a plurality of third turbine rotor blades, each third turbine rotor blade having a fifth closed passage for the flow of steam and a sixth passage for the flow of gas which is open to discharge the gas from the trailing edge of the third turbine rotor blade, a second sealing arrangement extending axially between the second and third rotor stages, the second sealing arrangement having at least one passage extending axially between the second and third rotor stages, a second chamber formed between the second and third rotor stages and the second sealing arrangement, the at least one passage in the first sealing arrangement being arranged to supply cooling gas to the second chamber, the second chamber supplying cooling gas to the sixth passages in the third turbine rotor blades, means to supply steam to the fifth passages in the third turbine rotor blades, the fifth passages being arranged to supply steam to the at least one passage in the second sealing arrangement, said at least one passage in the second sealing arrangement being arranged to supply steam to the third passages in the second turbine rotor blades and the third passages being arranged to supply steam to the first chamber.

Preferably the third rotor stage is axially downstream of the second turbine rotor stage and the second turbine rotor stage is axially downstream of the first turbine rotor stage.

Preferably the sealing arrangements between two adjacent turbine rotor stages includes, on each turbine rotor stage, a circumferentially extending sealing formation extending from the turbine rotor stage axially towards the other disc and bridging part of the space between the two turbine rotor stages, free ends of the two sealing arrangements cooperating to form a seal and each sealing arrangement comprising a plurality of segments, the segments locating in the rotor disc serrations.

Preferably the sealing arrangements are each about half the blade platform to blade platform spacing in axial extent.

Preferably each sealing segment comprises a body having a radially inner root portion provided with serrations complementary to the serrations provided in the periphery of the turbine rotor disc, and a column extending radially from such root portion supports a relatively thin sealing panel which provides outwardly extending fins for sealing engagement with platforms on the inner ends of the stator vanes.

Preferably the panel has a generally axially extending spine united with its column.

Preferably each sealing segment is mounted by a root which engages the same disc serration, or serrations, as a root of a turbine rotor blade and each sealing segment is connected to its respective turbine rotor blade to restrain it against axial movement out of the serration, or serrations.

Preferably the connection is by means of a dovetail slot, or a T-slot.

Preferably the spines of the sealing segments are hollow to define axially extending passages for the flow of cooling fluid, the axially extending passages in the spines on the sealing segments on the upstream rotor disc are in alignment with the axially extending passages in the spines on the sealing segments on the downstream rotor disc.

Preferably the bodies of the sealing segments on at least one of the upstream rotor disc or the downstream rotor disc are hollow to define radially extending passages for the flow of cooling fluid.

Preferably at least one sealing plate is located between at least one of the sealing arrangements and the corresponding turbine rotor stage.

Preferably there are a plurality of sealing plates, each sealing plate locates in a recess a respective one of the sealing arrangements.

The present invention also provides a gas turbine engine including a multi-stage turbine having a closed cycle steam cooling system and an open cycle gas cooling system, said engine comprising a first rotor stage having a plurality of first turbine rotor blades, each first turbine rotor blade having a first closed passage for the flow of steam and a second passage for the flow of gas which is open to discharge the gas from the trailing edge of the first turbine rotor blade, a second rotor stage having a plurality of second turbine rotor blades, each second turbine rotor blade having a third closed passage for the flow of steam and a fourth passage for the flow of gas which is open to discharge the gas from the trailing edge of the second turbine rotor blade, a first sealing arrangement extending axially between the first and second rotor stages, the first sealing arrangement having at least one passage extending axially between the first and second rotor stages, a first chamber formed between the first and second rotor stages and the first sealing arrangement, means to supply cooling gas to the second passages in the first turbine rotor blades and the at least one passage in the first sealing arrangement, said at least one passage in the first sealing arrangement being arranged to supply cooling gas to the fourth passages in the second turbine rotor blades, means to supply steam to the first passages in the first turbine rotor blades and the first passages being arranged to supply steam to the first chamber.

Preferably there is a third rotor stage having a plurality of third turbine rotor blades, each third turbine rotor blade having a fifth closed passage for the flow of steam and a sixth passage for the flow of gas which is open to discharge the gas from the trailing edge of the third turbine rotor blade, a second sealing arrangement extending axially between the second and third rotor stages, the second sealing arrangement having at least one passage extending axially between the second and third rotor stages, a second chamber formed between the second and third rotor stages and the second sealing arrangement, the at least one passage in the first sealing arrangement being arranged to supply cooling gas to the second chamber, the second chamber supplying cooling gas to the sixth passages in the third turbine rotor blades, means to supply steam to the fifth passages in the third turbine rotor blades, the fifth passages being arranged to supply steam to the at least one passage in the second sealing arrangement, said at least one passage in the second sealing arrangement being arranged to supply steam to the third passages in the second turbine rotor blades and the third passages being arranged to supply steam to the first chamber.

BRIEF DESCRIPTION OF THE DRAWINGS

The invention will be described further, by way of example, with reference to the accompanying drawings, wherein.

DETAILED DESCRIPTION OF THE INVENTION

Figure 1:
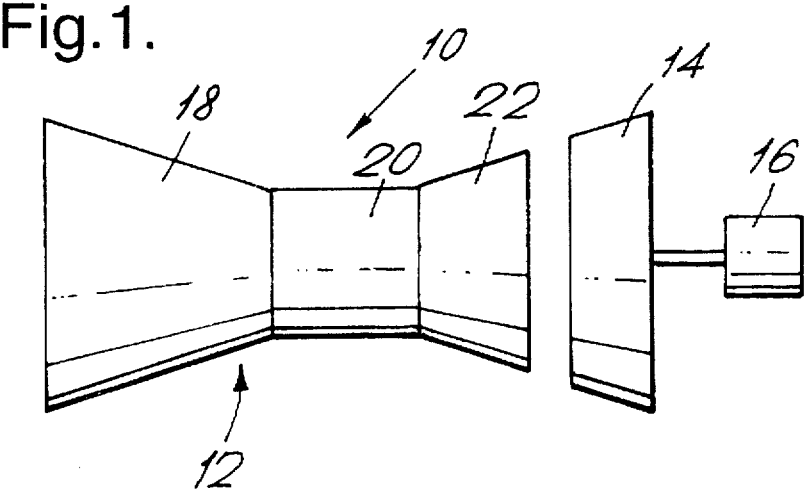
FIG. 1 shows diagrammatically an industrial gas turbine engine.

Referring to the drawings, in FIG. 1 there is shown an industrial gas turbine power plant 10 comprising a gas generator 12 and a power turbine 14 arranged to drive a load 16 which may be for example an electricity generator or a pump. The gas generator 12 comprises, in axial flow series, a compressor 18, a combustor 20 and a turbine 22 mounted on a common shaft with the compressor 18. High temperature, high velocity gas produced in the gas generator 12 by combustion of fuel and compressed air in the combustor 20, drives turbine 22, which drives the compressor 18 through the common shaft. The excess power in the turbine gases after passage through the turbine 22 is used to drive the power turbine 14.

Figure 2:
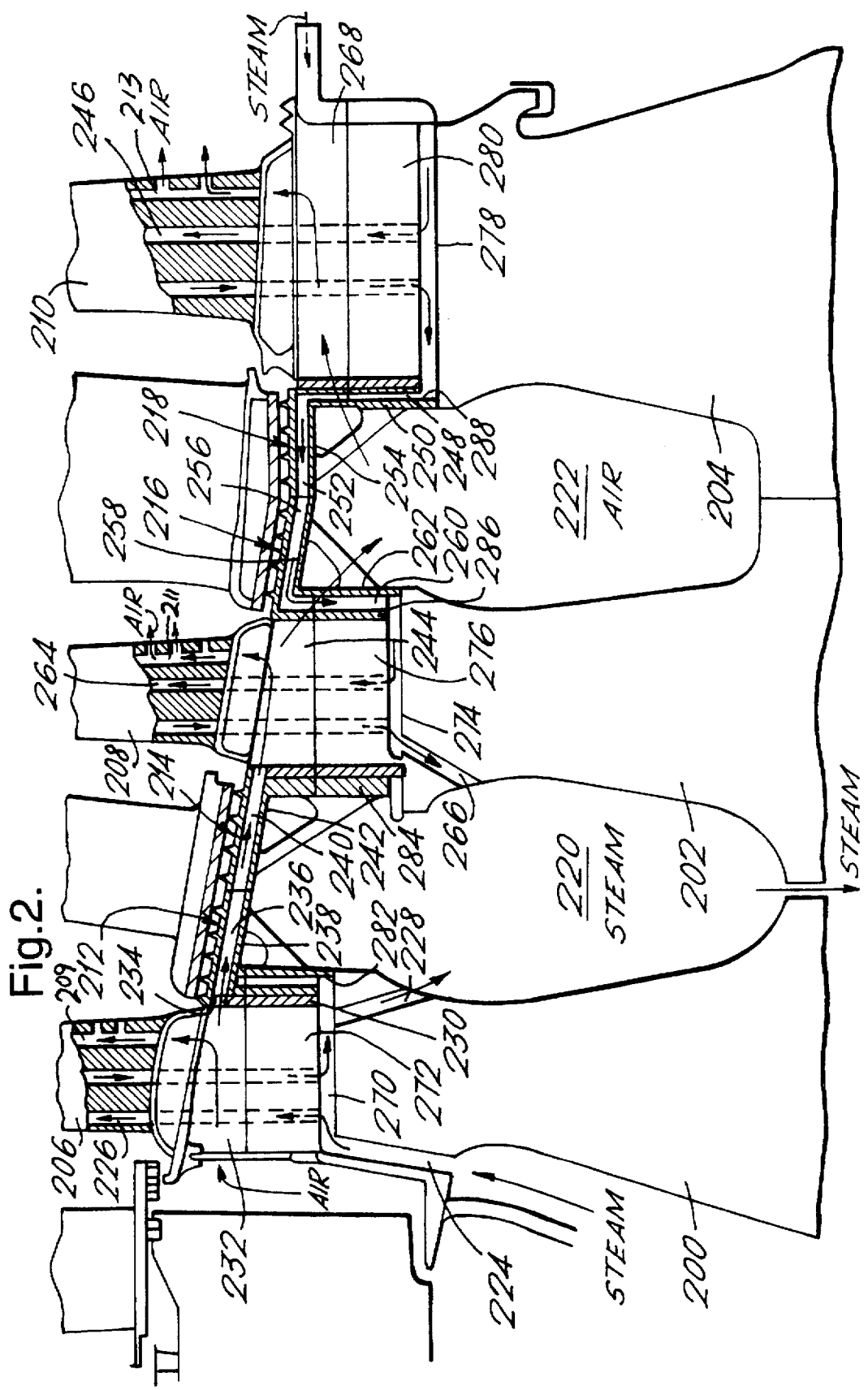
FIG. 2 shows part of a gas turbine incorporating a multi-stage turbine having a combined closed cycle steam cooling system and open cycle gas cooling system according to the present invention.

In FIG. 2 is shown a combined closed cycle steam cooling system and an open cycle gas cooling system in the turbine of an industrial gas turbine engine, which the sealing segments are provided with axially extending spines at the circumferentially central region of the panels. Steam is supplied in a closed cycle loop to cooling passages at least at the leading edge, or central region, of the turbine rotor blades and air is supplied in an open cycle to cooling passages at least at the trailing edge of the turbine rotor blades. The cooling air is discharged from the cooling passages at the trailing edge of the turbine rotor blades into the working fluid.

The first stage rotor disc 200 carries turbine rotor blades 206, the second stage rotor disc 202 carries turbine rotor blades 208 and the third stage rotor disc 204 carries turbine rotor blades 210. A first set of sealing segments 212 extends in a downstream direction from the first rotor disc 200 and a second set of sealing segments 214 extends in an upstream direction from the second rotor disc 202. Similarly a third set of sealing segments 216 extends in a downstream direction form the second rotor disc 202 and a fourth set of sealing segments 218 extends in an upstream direction from the third rotor disc 204. A chamber 220 is formed between the first and second rotor discs 200 and 202, and a chamber 222 is formed between the second and third rotor discs 202 and 204.

Steam is supplied through passages 224 and along serrations in the first rotor disc 200 to the passages 226 at the leading edge of the turbine rotor blades 206. The steam is returned from the passages 226 in the turbine rotor blades 206 through passages 228 in the first rotor disc 200 to the chamber 220. A plurality of seal plates 230 are provided between the sealing segments 212 and the turbine rotor blades 206 to separate the chamber 220 from the spaces 232 between the shanks of the turbine rotor blades 206.

Air is supplied to the spaces 232 between the shanks of the turbine rotor blades 206 and a first portion of the air flows into cooling air passages 209 at the trailing edges of the turbine rotor blades 206. A second portion of the air supplied to the spaces 232 flows through apertures 234 in the seal plates 230 to the axially extending passages 236 in the spines 238 of the sealing segments 212. The air supplied to the passages 236 flows into axially extending passages 240 in the spines 242 of the sealing segments 214. A plurality of seal plates are provided between the sealing segments 214 and the turbine rotor blades 208 to separate the chamber 220 from the spaces 244 between the shanks of the turbine rotor blades 208. The cooling air flowing through the passages 240 flows into the spaces 244 between the shanks of the turbine rotor blades 208 and a first portion of the cooling air flows into cooling air passages 211 at the trailing edges of the turbine rotor blades 208. The remaining portion of the air supplied to the spaces 244 flows into the chamber 222. The cooling air flowing through the cooling air passages at the trailing edge of the turbine blades is discharged into the gas flow.

Steam is supplied along the serrations in the third rotor disc 204 to the passages 246 at the leading edge of the turbine rotor blades 210. The steam is returned from the passages 246 in the turbine rotor blades 210 and along the serrations in the third rotor disc 204 to the sealing segments 218. The sealing segments 218 have radially extending passages 248 in their bodies 250 and axially extending passages 252 in their spines 254. The passages 252 align with axially extending passages 256 in the spines 258 of the sealing segments 216. The sealing segments 216 also have radially extending passages 260 in their bodies 262. The passages 248, 252, 256 and 260 convey cooling steam to the serrations in the second rotor disc 202. The steam then flows to the passages 264 at the leading edge of the turbine rotor blades 208. The steam is returned from the passages 264 to the serrations and is discharged through passages 266 in the second rotor disc 202 to the chamber 220.

Air is supplied from chamber 222 into the spaces 268 between the shanks of the turbine rotor blades 210 and a portion of the air flows into cooling air passages 213 at the trailing edges of the turbine rotor blades 210. The cooling air flowing through the cooling air passages at the trailing edge of the turbine blades is discharged into the gas flow. The remainder of the cooling air in the spaces 268 between the shanks of the turbine rotor blades 210 is discharged in a downstream direction for further cooling purposes.

In FIG. 2 the first stage rotor disc 200 has serrations 270, each of which receives the root 272 of one of the plurality of turbine rotor blades 206. Similarly the second stage rotor disc 202 has serrations 274, each of which receives the root 276 of one of the plurality of turbine rotor blades 208. Also the third stage rotor disc 204 has serrations 278, each of which receives the root 280 of one of the turbine rotor blades 210.

Each of the serrations 270 also receives a root 282 of one of the plurality of circumferentially arranged sealing segments 212. Similarly each of the serrations 274 receives a root 284 of one of the plurality of circumferentially arranged sealing segments 214 and also receives a root 286 of one of the plurality of circumferentially arranged sealing segments 216. Additionally each of the serrations 278 receives a root 288 of one of the plurality of circumferentially arranged sealing segments 218. Each sealing segment has a main operative panel 285 carrying sealing ribs which cooperate, in conventional manner, with surfaces on the platforms of stator vanes.

The panels are relatively thin to render the segments of relatively low weight and therefore centrifugal forces are reduced. The panels are usually a segment of a cone or a segment of a cylinder.

All of the sealing segments 212, 214 unite to form a frusto-conical sealing formation or a cylindrical sealing formation which extends axially between the first stage rotor disc 200 and the second stage rotor disc 202. All of the sealing segments 216, 218 unite to form a frusto-conical sealing formation or a cylindrical sealing formation which extends axially between the second stage rotor disc 202 and the third stage rotor disc 204. The free edges of the two formations are sealingly engaged and provide an effective heat shield and sealing arrangement on the internal periphery of the annular gas flow passage.

The ribs on the circumferentially adjacent sealing segments unite to form circumferentially extending sealing fins.

In order to guard against the centrifugal force withdrawing the roots 282, 284, 286 and 288 of the sealing segments 212, 214, 216, 218 respectively from the serrations 270, 274 and 278 respectively, the roots 282, 284, 286 and 288 of the sealing segments 212, 214, 216 and 218 respectively and the adjacent roots 272, 276, 280 of the respective turbine rotor blades 206, 208 and 210 are provided with complementary positive interlocking formations which lock the roots of the sealing segments to the roots of the turbine rotor blades and prevent the roots of the sealing segments from leaving the serrations of the respective turbine rotor disc.

The interlocking formations may take any convenient form, but a dovetail or a T-slot connection is desirable.

Figure 3:
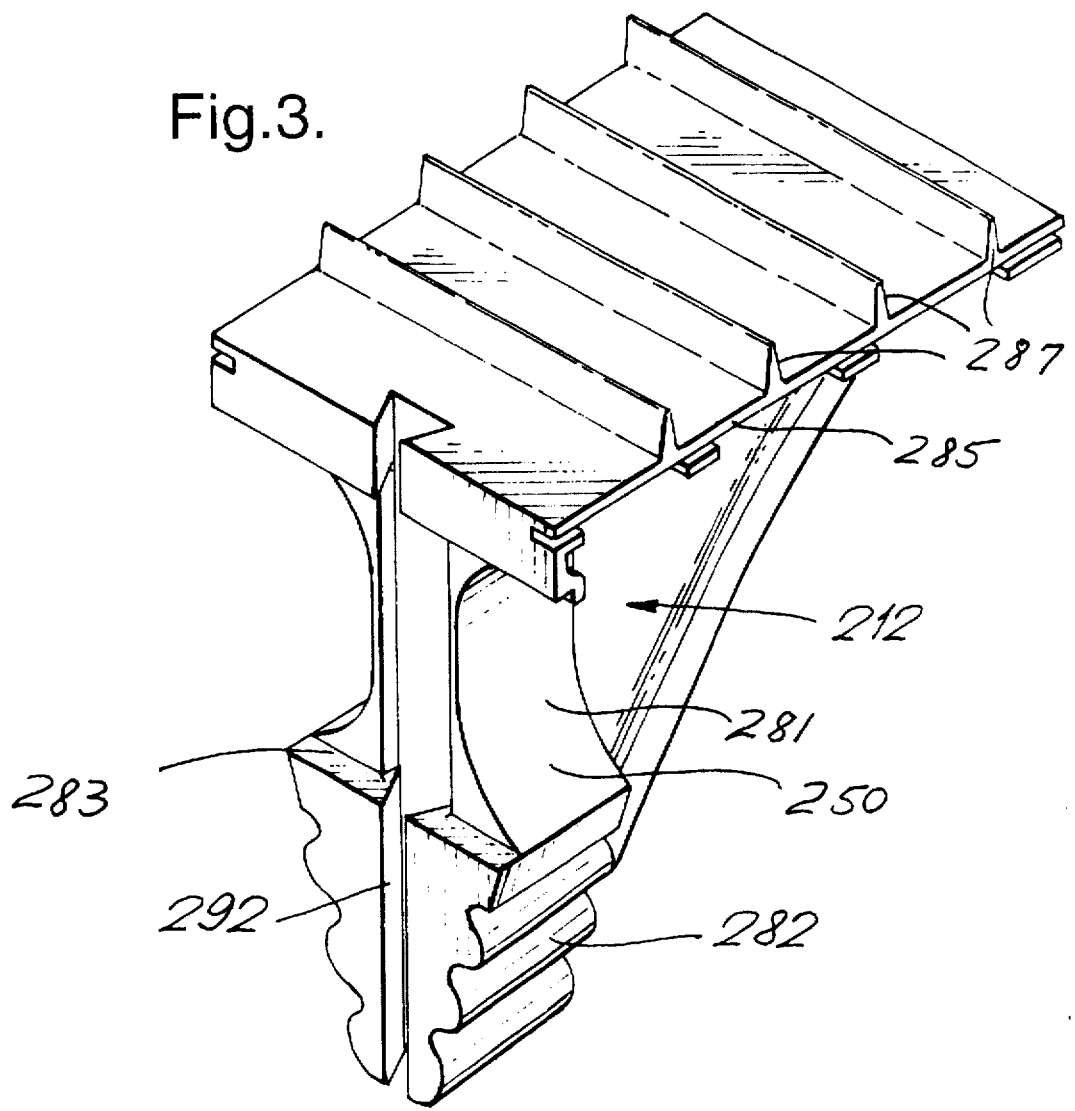
FIG. 3 is a perspective view of a sealing segment shown in FIG. 2.
Figure 4:
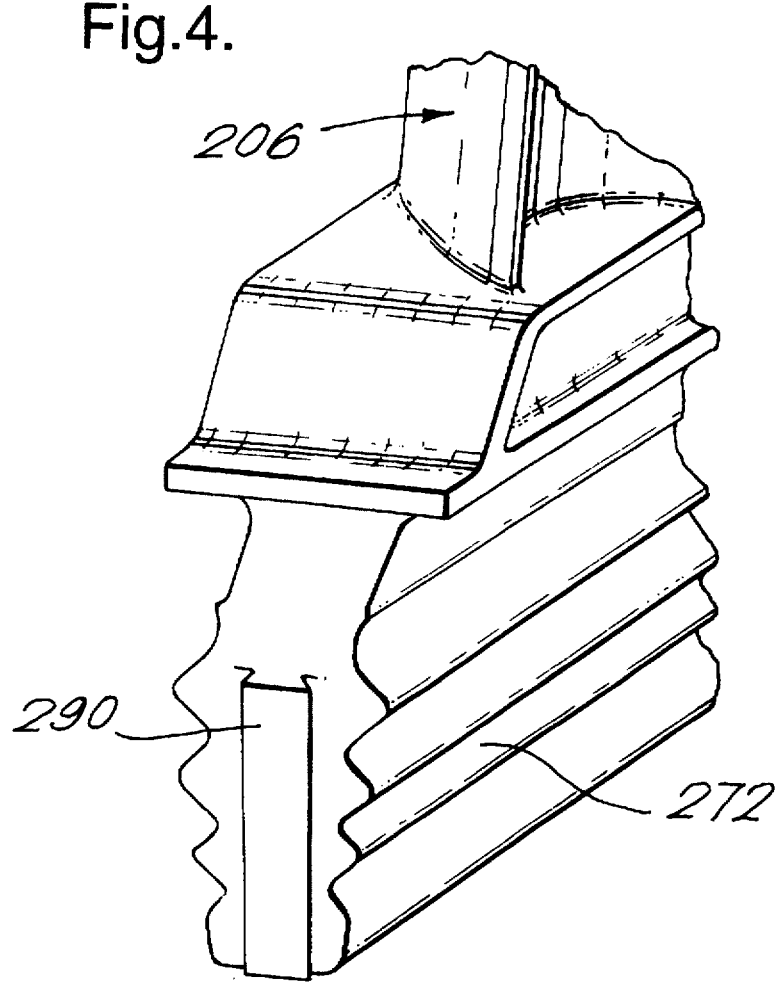
FIG. 4 is a perspective view of a turbine rotor blade shown in FIG. 2.

FIGS. 3 and 4 show the root 272 of the turbine rotor blade 206 provided within a dovetail tongue 290 which engages in a dovetail slot 292 in the root 282 of the sealing segment 212. It is of course possible to provide the tongue on the sealing segment and the slot on the blade.

Other variations are possible, for example one of the roots may be provided with a tennon and the other a mortice, a fastener or fasteners being passed through the two to unite the tennon and the mortice.

It may be possible to arrange for other arrangements of cooling flow in the roots, spines and body and columns 281 of the sealing segments.

Figure 5:
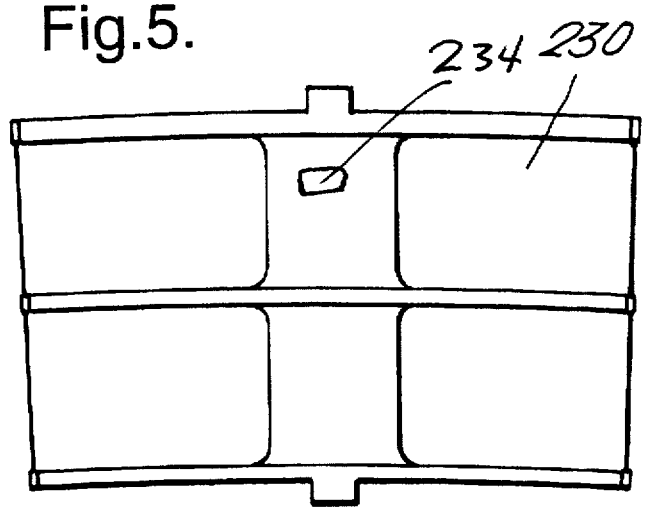
FIG. 5 is a perspective view of a sealing plate shown in FIG. 2.

FIG. 5 shows a sealing plate 230 which locates in the recess of a sealing segment 212.

It is of course possible to provide axially extending passages in other types of sealing segments, for example the sealing segments described in GB2272946A, GB2279947A or GB2280478A the contents of which are hereby incorporated by reference.

Thus it can be seen that by providing the axially extending passages in the sealing arrangement between adjacent turbine rotor stages it is possible to arrange for the steam and cooling gas to be supplied to the turbine rotor blades without the leakage of steam into the gas or visa-versa. The cooling gas is preferably air from the compressor of the gas turbine engine.

The axially extending passages in the sealing arrangement between adjacent turbine rotor stages may also be used to for other different cooling fluids, or the same cooling fluid but at different pressures, to enable the cooling fluids to be supplied to the respective passages in the turbine rotor blades without the cooling fluids intermingling.

We claim:

1. A gas turbine engine including a multi-stage turbine having a first cooling system and a second cooling system, said engine comprising a first rotor stage having a plurality of first turbine rotor blades, each first turbine rotor blade having a first passage for the flow of a first cooling fluid and a second passage for the flow of a second cooling fluid, a second rotor stage having a plurality of second turbine rotor blades, each second turbine rotor blade having a third passage for the flow of the first cooling fluid and a fourth passage for the flow of the second cooling fluid, a first sealing arrangement extending axially between the first and second rotor stages, a first chamber formed between the first and second rotor stages and the first sealing arrangement, the first sealing arrangement having at least one passage extending axially between the first and second rotor stages to supply the first cooling fluid between the first and second rotor stages, the first cooling system being arranged to supply first cooling fluid to the first passages in the first turbine rotor blades and being arranged to supply first cooling fluid through the at least one passage extending axially through the first sealing arrangement to the third passages in the second turbine rotor blades.

2. A gas turbine engine as claimed in claim 1 wherein the multi-stage turbine has a closed cycle steam cooling system and an open cycle gas cooling system, each first turbine rotor blade having a first passage for the flow of gas and a second closed passage for the flow of steam, each first turbine blade has a trailing edge which is open to discharge gas from the first passage through the trailing edge of the first turbine rotor blade, each second turbine rotor blade having a third passage for the flow of gas and a fourth closed passage for the flow of steam, each second turbine blade having a trailing edge which is open to discharge gas from the third passage through the trailing edge of the second turbine rotor blade, a first sealing arrangement extending axially between the first and second rotor stages.

3. A gas turbine engine as claimed in claim 2 wherein the multi-stage turbine has a closed cycle steam cooling system and an open cycle gas cooling system, each first turbine rotor blade having a first closed passage for the flow of steam and a second passage for the flow of gas, each first turbine blade has a trailing edge which is open to discharge gas from the second passage through the trailing edge of the first turbine rotor blade, each second turbine rotor blade having a third closed passage for the flow of steam and a fourth passage for the flow of gas, each second turbine blade has a trailing edge which is open to discharge gas from the fourth passage through the trailing edge of the second turbine rotor blade, a first sealing arrangement extending axially between the first and second rotor stages.

4. A gas turbine engine as claimed in claim 3 comprising means to supply cooling gas to the first passages in the first turbine rotor blades and the at least one passage in the first sealing arrangement, said at least one passage in the first sealing arrangement being arranged to supply cooling gas to the third passages in the second turbine rotor blades, means to supply steam to the first passages in the first turbine rotor blades and the first passages being arranged to supply steam to the second chamber.

5. A gas turbine engine as claimed in claim 3 comprising means to supply steam to the first passages in the first turbine rotor blades and the at least one passage in the first sealing arrangement, said at least one passage in the first sealing arrangement being arranged to supply steam to the third passages in the second turbine rotor blades, means to supply cooling gas to the second passages in the first turbine rotor blades and means to supply cooling gas to the fourth passages in the second turbine rotor blades.

6. A gas turbine engine as claimed in claim 4 comprising a third rotor stage having a plurality of third turbine rotor blades, each third turbine rotor blade having a fifth passage for the flow of air and a sixth closed passage for the flow of steam, each third turbine rotor blade has a trailing edge which is open to discharge gas from the fifth passage through the trailing edge of the third turbine rotor blade, a second sealing arrangement extending axially between the second and third rotor stages, the second sealing arrangement having at least one passage extending axially between the second and third rotor stages, the second sealing arrangement having at least one passage extending axially between the second and third rotor stages, a second chamber formed between the second and third rotor stages and the second sealing arrangement, the at least one passage in the first sealing arrangement being arranged to supply cooling gas to the second chamber, the second chamber supplying cooling gas to the fifth passages in the third turbine rotor blades, means to supply steam to the sixth passages in the third turbine rotor blades, the sixth passages being arranged to supply steam to the at least one passage in the second sealing arrangement, said at least one passage in the second sealing arrangement being arranged to supply steam to the fourth passages in the second turbine rotor blades and the fourth passages being arranged to supply steam to the first chamber.

7. A gas turbine engine as claimed in claim 6 wherein the third rotor stage is axially downstream of the second turbine rotor stage and the second turbine rotor stage is axially downstream of the first turbine rotor stages.

8. A gas turbine engine as claimed in claim 2 wherein the sealing arrangements between two axially spaced adjacent turbine rotor stages includes, on each turbine rotor stage, a circumferentially extending sealing formation extending from the turbine rotor stage axially towards the other turbine rotor stage and bridging part of the axial space between the two turbine rotor stages, the two sealing formations having free ends which cooperate to form a seal and each sealing formation comprising a plurality of segments, the turbine rotor stages having serrations in their periphery, the segments locating in the turbine rotor stage serrations.

9. A gas turbine engine as claimed in claim 8 wherein the turbine rotor blades locate in the turbine rotor stage serrations, and the turbine rotor blades have blade platforms, the sealing arrangements are each about half the blade platform to blade platform spacing in axial extent.

10. A gas turbine engine as claimed in claim 8 wherein each sealing segment comprises a body having a radially inner root portion provided with serrations complementary to the serrations provided in the periphery of the turbine rotor stage, and a column extending radially from such root portion, a relatively thin sealing panel which provides outwardly extending fins for sealing engagement with platforms on the inner ends of cooperating stator vanes, the column supports the thin sealing panel.

11. A gas turbine engine as claimed in claim 10 wherein the panel has a generally axially extending spine united with its column.

12. A gas turbine engine as claimed in claim 1 wherein each sealing segment is mounted by a root which engages the same turbine rotor stage serration, or serrations, as a root of a turbine rotor blade and each sealing segment is connected to its respective turbine rotor blade to restrain it against axial movement out of the serration, or serrations.

13. A gas turbine engine as claimed in claim 12 wherein the connection is by means of a dovetail slot, or a T-slot.

14. A gas turbine engine as claimed in claim 11 wherein the spines of the sealing segments are hollow to define axially extending passages for the flow of cooling fluid, the axially extending passages in the spines on the sealing segments on the upstream rotor disc are in alignment with the axially extending passages in the spines on the sealing segments on the downstream rotor disc.

15. A gas turbine engine as claimed in claim 14 wherein the bodies of the sealing segments on at least one of the upstream rotor disc or the downstream rotor disc are hollow to define radially extending passages for the flow of cooling fluid.

16. A gas turbine engine as claimed claim 1 herein at least one sealing plate is located between at least one of the sealing arrangements and the corresponding turbine rotor stage.

17. A gas turbine engine as claimed in claim 16 wherein there are a plurality of sealing plates, each sealing plate locates in a recess in a respective one of the sealing arrangements.

18. A gas turbine engine including a multi-stage turbine having a closed cycle steam cooling system and an open cycle gas cooling system, said engine comprising a first rotor stage having a plurality of first turbine rotor blades, each first turbine rotor blade having a first closed passage for the flow of steam and a second passage for the flow of gas, each first turbine blade having a trailing edge which is open to discharge the gas from the second passage through the trailing edge of the first turbine rotor blade, a second rotor stage having a plurality of second turbine rotor blades, each second turbine rotor blade having a third closed passage for the flow of steam and a fourth passage for the flow of gas, each second turbine blade having a trailing edge which is open to discharge the gas from the fourth passage through the trailing edge of the second turbine rotor blade, a first sealing arrangement extending axially between the first and second rotor stages, the first sealing arrangement having at least one passage extending axially between the first and second rotor stages, a first chamber formed between the first and second rotor stages and the first sealing arrangement, means to supply cooling gas to the second passages in the first turbine rotor blades and the at least one passage in the first sealing arrangement, said at least one passage in the first sealing arrangement being arranged to supply cooling gas to the fourth passages in the second turbine rotor blades, means to supply steam to the first passages in the first turbine rotor blades and the first passages being arranged to supply steam to the first chamber.

19. A gas turbine engine as claimed in claim 18 comprising a third rotor stage having a plurality of third turbine rotor blades, each third turbine rotor blade having a fifth closed passage for the flow of steam and a sixth passage for the flow of gas, each third turbine blade having a trailing edge which is open to discharge the gas from the sixth passage through the trailing edge of the third turbine rotor blade, a second sealing arrangement extending axially between the second and third rotor stages, the second sealing arrangement having at least one passage extending axially between the second and third rotor stages, a second chamber formed between the second and third rotor stages and the second sealing arrangement, the at least one passage in the first sealing arrangement being arranged to supply cooling gas to the second chamber, the second chamber supplying cooling gas to the sixth passages in the third turbine rotor blades, means to supply steam to the fifth passages in the third turbine rotor blades, the fifth passages being arranged to supply steam to the at least one passage in the second sealing arrangement, said at least one passage in the second sealing arrangement being arranged to supply steam to the third passages in the second turbine rotor blades and the third passages being arranged to supply steam to the first chamber.

* * * * *